US006249386B1

(12) United States Patent
Yona et al.

(10) Patent No.: US 6,249,386 B1
(45) Date of Patent: Jun. 19, 2001

(54) NON-ADJUSTABLE HELMET MOUNTED OPTICAL SYSTEMS

(75) Inventors: Zvi Yona, Karkur; Joseph Yaeli, Haifa, both of (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 09/361,216

(22) Filed: Jul. 27, 1999

(30) Foreign Application Priority Data

Jul. 28, 1998 (IL) ..................................................... 125558

(51) Int. Cl.[7] .............................. G02B 27/14; A42B 3/00

(52) U.S. Cl. .......................... 359/630; 359/632; 359/815; 359/409; 359/809; 2/6.2; 2/6.3; 2/414; 2/442; 345/8; 352/39; 352/57

(58) Field of Search .................................... 359/630, 632, 359/809, 811, 815, 409; 345/8, 7; 2/6.1, 6.2, 6.3, 410, 421, 422, 411, 414; 352/39, 57; 428/188

(56) References Cited

U.S. PATENT DOCUMENTS 3,956,773 * 5/1976 Chisum .................................... 2/414
4,100,320 * 7/1978 Chisum ................................ 428/188
4,461,553 * 7/1984 Doerr et al. ........................... 352/39
5,581,806 * 12/1996 Capdepuy et al. ......................... 2/6.2
5,752,276 * 5/1998 Baudou et al. ............................ 2/6.3
5,786,932 * 7/1998 Pniel .................................... 359/409
5,914,816 * 6/1999 Soto et al. ........................... 359/630
5,943,174 * 8/1999 Bryant et al. ........................ 359/809
6,008,779 * 12/1999 Ellis ........................................ 345/8

FOREIGN PATENT DOCUMENTS

0675692 B1 12/1993 (EP) .
2688661 3/1992 (FR) .

* cited by examiner

*Primary Examiner*—Loha Ben
(74) *Attorney, Agent, or Firm*—Eitan, Pearl, Latzer & Cohen-Zedek

(57) ABSTRACT

Helmet mounted system is provided which includes a helmet which is custom fitted to a user, an optical system which is removably attachable to the helmet, an attachment which is fixedly attached to the optical system, and a mount which is custom fitted and fixedly attached to the helmet. The mount is located on the helmet such that once the attachment is snap-fit onto the mount, the optical system is in place for use by the user, without any further adjustment.

7 Claims, 19 Drawing Sheets

16 18 10 12 14 20

NON-ADJUSTABLE HELMET MOUNTED OPTICAL SYSTEMS

FIELD OF THE INVENTION

The present invention relates to helmet mounted appliances generally and more particularly to helmet mounted personal viewing systems.

BACKGROUND OF THE INVENTION

Helmets are general head gear for a variety of mobile vehicles users, including from bicyclists, motorcyclists, pilots, etc. Generally, professional and military pilots of rotary-winged and fixed-winged aircraft have personally fitted helmets. Due to variation in body dimensions, such as different head size or eye location, attachments to the helmet which require precise positioning are custom fitted per pilot at the time of usage.

Among the attachments which require precise positioning are optical systems, such as night vision goggles and helmet mounted displays. In general, eye levels usually vary both horizontally and vertically; the inter-pupilary distance (IPD) (the distance between the two eyes) varies from between 52 to 72 mm, and the frontal position (the distance from the helmet edge to the eye line) varies by a similar range. Both these variants are products of varying head shape and size.

To date, helmet mounted displays are mounted onto the helmet by one of two methods. Option one entails an optical unit permanently mounted onto the helmet. In such a case, the optical unit id designed large enough to fit most users, and hence is usually excessively large and heavy.

The second option is to use a removable adaptable optical unit which is mounted onto the helmet before use and then adjusted to the personal dimensions of each user. This option, however, requires readjusting and repositioning the optical unit each and every time the optical unit is removed from the helmet of one user and remounted onto the helmet of another, as is frequently done with military platforms. Since it is common practice for one pilot to step out of the cockpit while another waits to get in, this time consuming procedure is routinely carried out numerous times per day.

An additional disadvantage of the removable adaptable optical unit is the excessive wear and tear on the connecting elements. If the connecting elements are produced to meet light weight requirements, they wear quickly; if the elements are produced to withstand constant removal, they generally are exceedingly heavy for comfortable wear.

Night vision goggles have an added difficulty. In order to produce a light weight unit, most night vision goggles have numerous plastic parts, such as plastic screws. The plastic parts are not especially durable under multiple adjustments and stresses, and deteriorate with each remount and subsequent readjustment of the system.

Two examples of prior art helmet mounted systems are described in EPO patent 0675692 B1 and French patent application 268866, both of which describe adjustable helmet mounted optical systems.

SUMMARY OF THE INVENTION

An object of the present invention is to provide an improved mount for an optical assembly for helmet mounted applications.

A further object of the present invention is to provide an optical and mount assembly which is removable, transferable from one helmet to another helmet, and which does not require readjustment before operation.

There is thus provided, in accordance with a preferred embodiment of the present invention, a helmet mounted system including a helmet which is custom fitted to a user, an optical system which is removably attachable to the helmet, an attachment which is fixedly attached to the optical system, and a mount which is custom fitted and fixedly attached to the helmet. The mount is located on the helmet such that once the attachment is snap-fit onto the mount, the optical system is in place for use by the user, without any further adjustment.

The system also includes an electrical connection connected to the optical system. Additionally the helmet is configured for use by any of the following group of users including a pilot, a motorcyclist, or a bicyclist. Furthermore, the optical system includes any of the following group including an image intensifier, a day/night optical system, a monocular, a binocular, a binocular, a camera, an image intensifier/charge coupling device, a display, or any optical relay system used for optical image eye transfer from direct or indirect optical source/electro-optic.

There is therefore provided in accordance with a preferred embodiment of the present invention, a method for preadjusting a helmet mounted system for a user, and including the steps of having a helmet custom fitted to a user's head, custom fitting a mount to the helmet; and attaching an optical system to the mount, thereby placing the optical system in place for use by the user, without additional adjustment.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
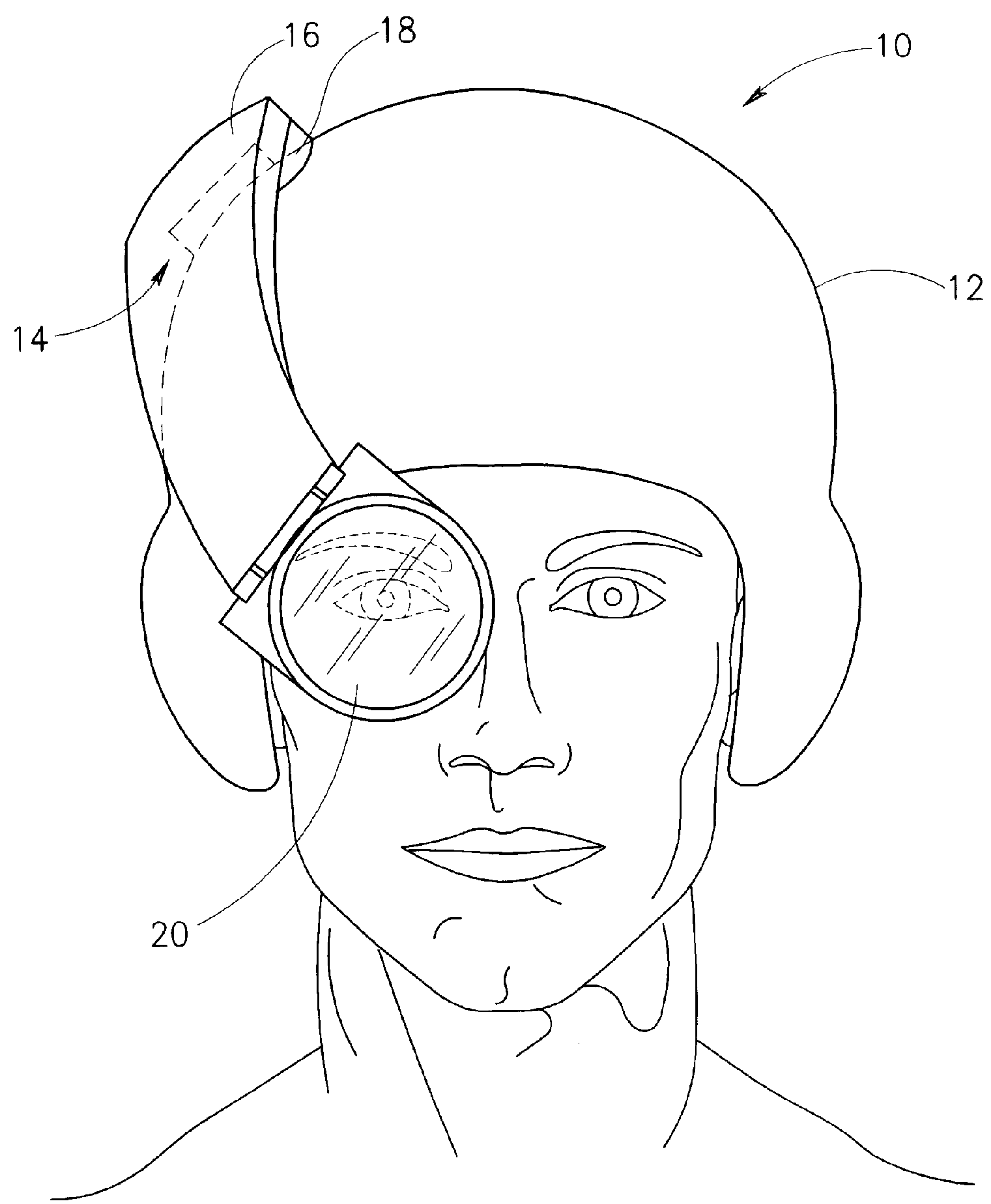
FIG. 1 is an isometric illustration of helmet mounted display system constructed and operative according to a preferred embodiment of the present invention.
Figure 2:
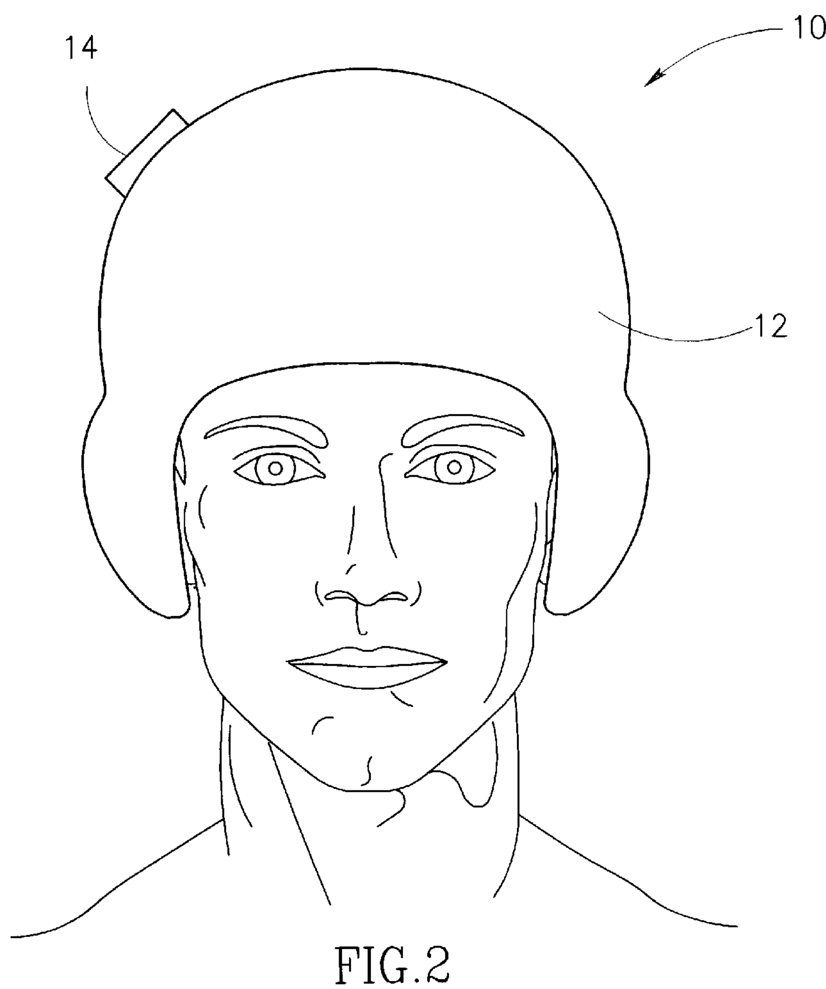
FIG. 2 is an isometric illustration of a helmet and a mount from FIG. 1.
Figure 3:
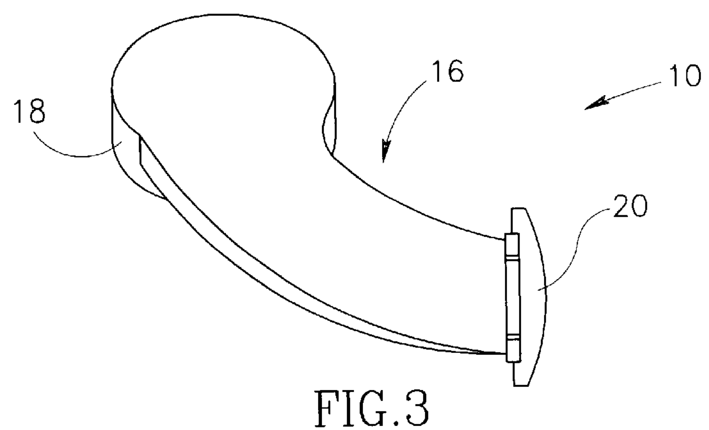
FIG. 3 is an isometric illustration of an optical display according to a preferred embodiment of the present invention.

Reference is now made to FIG. 1 which is a schematic diagram of a helmet mounted optical system 10, constructed and operative according to a preferred embodiment of the present invention. Reference is also made to FIGS. 2 and 3 which illustrate the separate elements of system 10.

System 10 of the present invention comprises apparatus for pre-positioning of a standard issue optical unit 16 onto a helmet 12, thereby eliminating positional re-adjustment after each remount of optical unit 16. A mount 14, attachable to helmet 12 and to optical unit 16, is pre-adjusted to the user's dimensions.

Although the present embodiment described hereinbelow refers to system 10 being employed by a pilot, it is apparent to those in the art that this invention is applicable for all helmet mounted applications and users.

As noted hereinabove, prior art helmet mounted optical systems required repositioning after every remount of optical unit 16 onto helmet 12. In a preferred embodiment of the present invention, the standard issue optical unit 16 is transferable from helmet 12 to another helmet (not shown), and is remountable with a no-adjustment mounting procedure that provides "snap-and-go" compatibility.

System 10 comprises helmet 12, a mount 14 and optical unit 16. Mount 14 is affixed onto helmet 12, and is used to hold optical unit 16 to helmet 12.

Helmet 12 is personally fitted per pilot in a manner well known in the art.

Mount 14 is a feature personalized per the exact head measurements of the pilot. Mount 14 is either a personalized mold, or alternatively, a permanently modified, fitted unit. The positioning of mount 14 is personalized per pilot and fixed during the helmet fitting stage. The positioning and the fitting can be done in either a two phase or one phase process, as described hereinbelow.

The exact angle, position and height of mount 14 is derived from a geometrical method described hereinbelow. The factors used in the method include some of the dimensions of the pilot's head, the helmet and the optical unit 16.

Optical unit 16 is a standard optical system as is known in the art, such as a helmet mounted display, and is used to assist pilots during fight. The function and shape of the optical unit 16 varies depending on the manufacturer. In a preferred embodiment, optical unit 16 is dedicated to an associated aircraft and remains with the associated aircraft between operational cycles. Each pilot that uses the aircraft utilizes its associated optical unit 16.

Optical unit 16 comprises an attachment 18 and optics 20.

Attachment 18 is permanently attached to optical unit 16 and is attachable to mount 14. Attachment 18 is anchored onto optical unit 16 with either adhesive or screws. Alternatively, attachment 18 is molded into the body of optical unit 16. Further, alternatively, attachment 18 is optional and optical unit 16 is attachable directly to mount 14.

Optics 20 is one or more optical elements and/or is used by the pilot to facilitate target positioning, night vision, or other optical usage. In order to operate properly, optics 20 must be precisely positioned in from of the pilot's eyes.

Before a flight, the pilot inserts the optical unit 16, and specifically attachment 18, into its location on the mount 14 of his personal helmet 12, and without any additional positional modification, optics 20 is precisely positioned in front of his eyes.

Figure 4A:
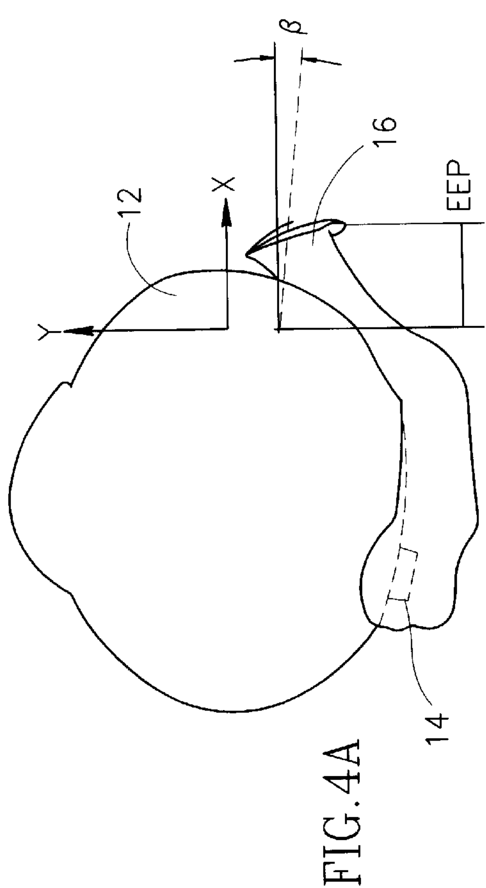
FIGS. 4A, 4B and 4C are schematic illustrations of a head and helmet measurements, according to a preferred embodiment of the present invention.
Figure 4B:
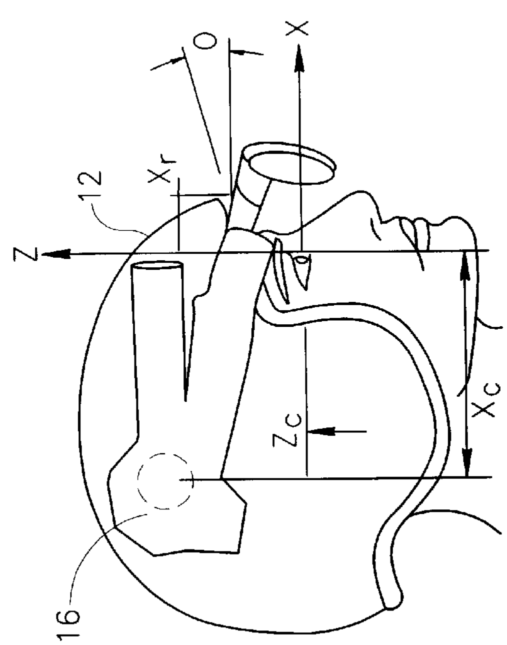
Figure 4C:
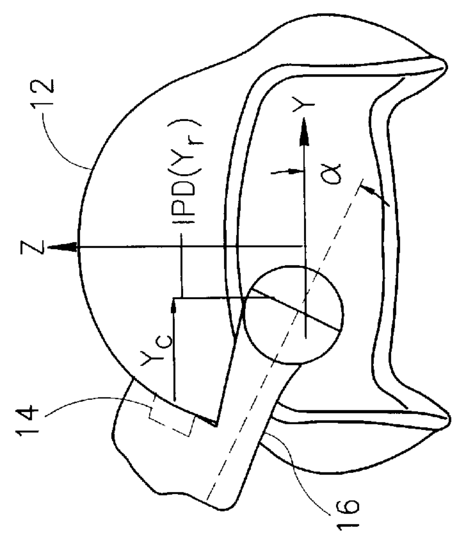

Reference is now made to FIGS. 4A, 4B and 4C which illustrate the dimensioned factors needed to determine the exact placement, height and angle, ($\alpha$, $\beta$, and $\theta$, respectively) of mount 14. The X, Y and Z axes are noted in the figures and are marked by their respective letters.

To determine the factors relating to the positioning of mount 14, the physical dimensions of the user are gathered either by photographing the user and determining his physical parameters from the photograph, or by physically measuring the user during the helmet fitting phase.

The relevant physical parameters are eye parameters $\alpha$, $\theta$, $\beta$, $X_c$, $Y_c$, and $Z_c$. These eye parameters are related to the helmet central datum $X_r$, $Z_r$ and $Y_r$ as illustrated in FIGS. 4A, 4B and 4C.

Once the physical parameters of the user are gathered, the exact position of the mount 14 is determined and fixed precisely on the personal user helmet.

Alternatively, the mount is fitted onto the helmet with a dedicated alignment holding fixture, in which case it is not necessary to gather the physical parameters. The fixture moves/aligns the optical unit 16 to the custom fitted proper location. Once the location is marked, the holder 14 is fixed at that location onto the helmet 12.

Figure 5:
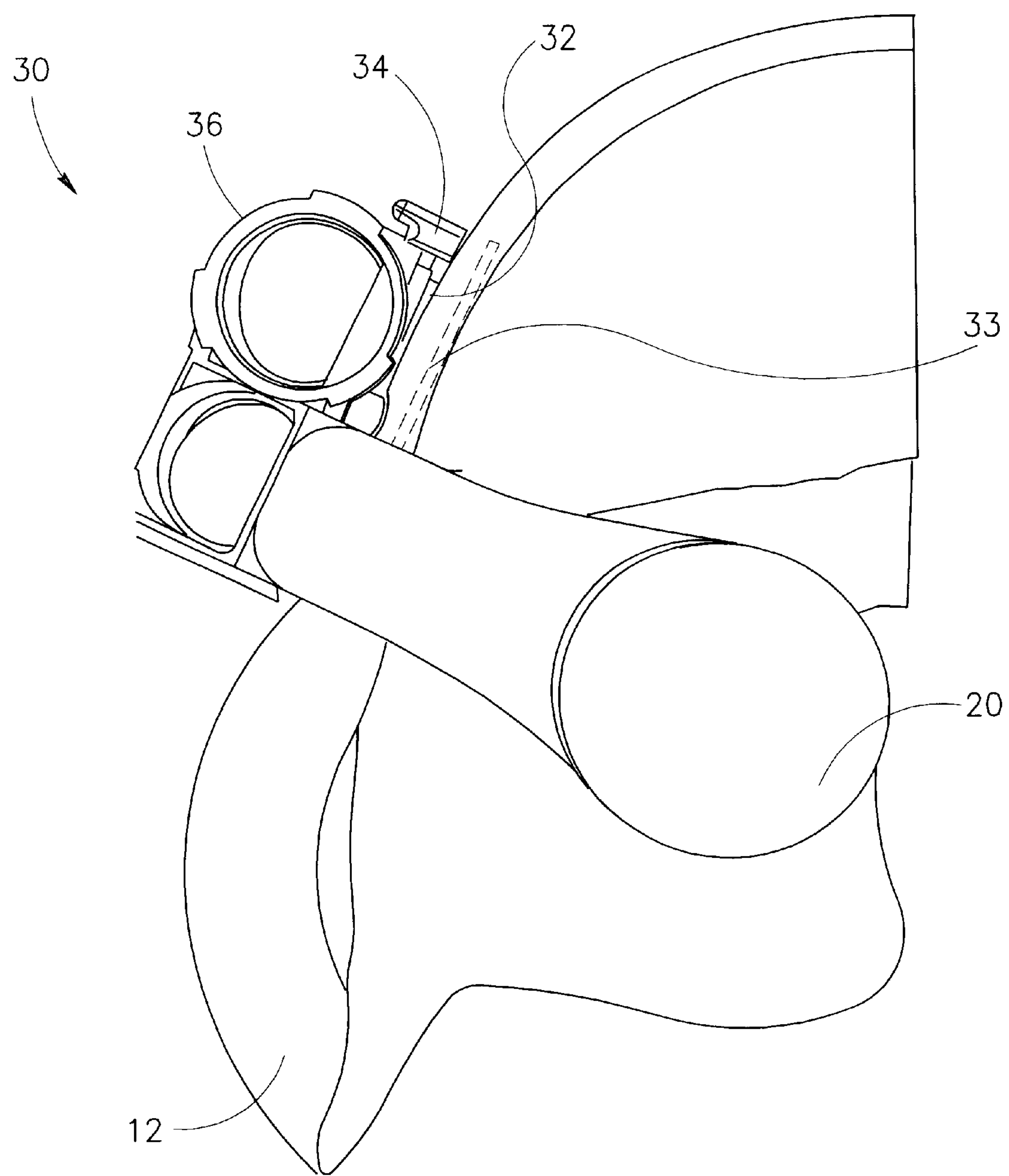
FIG. 5 is an isometric illustration of a helmet mounted display system, constructed and operative according to a preferred embodiment of the present invention.

Reference is now made to FIG. 5, an isometric diagram of a helmet mounted optical system 30 mounted onto helmet 12, constructed and operative according to a preferred embodiment of the present invention. As shown in this figure, an optical unit 36 is mounted onto helmet 12 in such a manner as to afford the pilot precise viewing through optics 20. Optical unit 36 could be any helmet mounted optical system such as a camera, image intensifier ($I^2$) and image intensifier/charge coupling device (ICCD,) etc.

Figure 6:
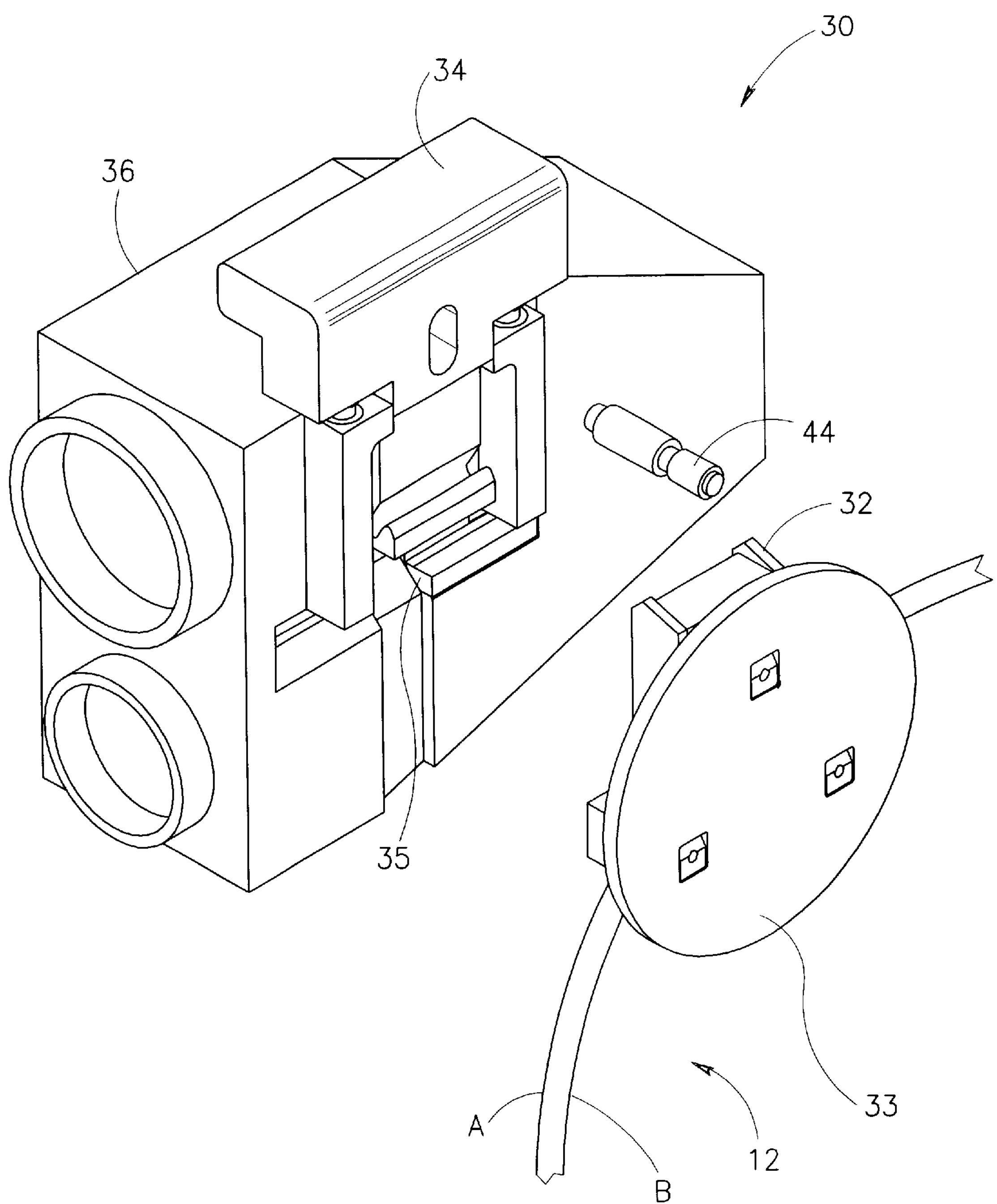
FIG. 6 an isometric illustration of the major elements forming the helmet mounted optical system of FIG. 5.

System's 30 major elements are illustrated in FIG. 6, which is an isometric illustration of the helmet mounted optical system 30 of FIG. 5. Although for clarity purposes the remaining figures which illustrate system 30 do not illustrate optics 20, it is apparent that optics 20 is an element in system 30.

System 30 comprises a mount 32, a base 33, an attachment 34, an electrical connector 35, an optical unit 36 and a rivet 44. Mount 32, attachment 34 and optical unit 36 have similar functions to those of their parallel elements described in FIGS. 1, 2 and 3.

Attachment 34 attaches to optical unit 36. Rivet 44 locks attachment 34 onto optical unit 36 and prevents unintentional movement of attachment 34.

Attachment 34 is removably attachable to mount 32. Mount 32 mounts onto the outside, referenced A, of helmet 12. Base 33 mounts onto the inside, referenced B, of helmet 12, directly opposite mount 32, and attaches, through helmet 12, to mount 32. Base 33 acts as a counterbalance to mount 32.

Electrical connector 35 is an optional feature attached to optical unit 36 and connectable to a meeting connector 37 not shown in FIG. 6. Electrical connector 35 supplies electrical current to electrical elements of the optical unit 36, such as a camera, image intensifier, illumination, etc., not shown in the Figures.

Figure 7A:
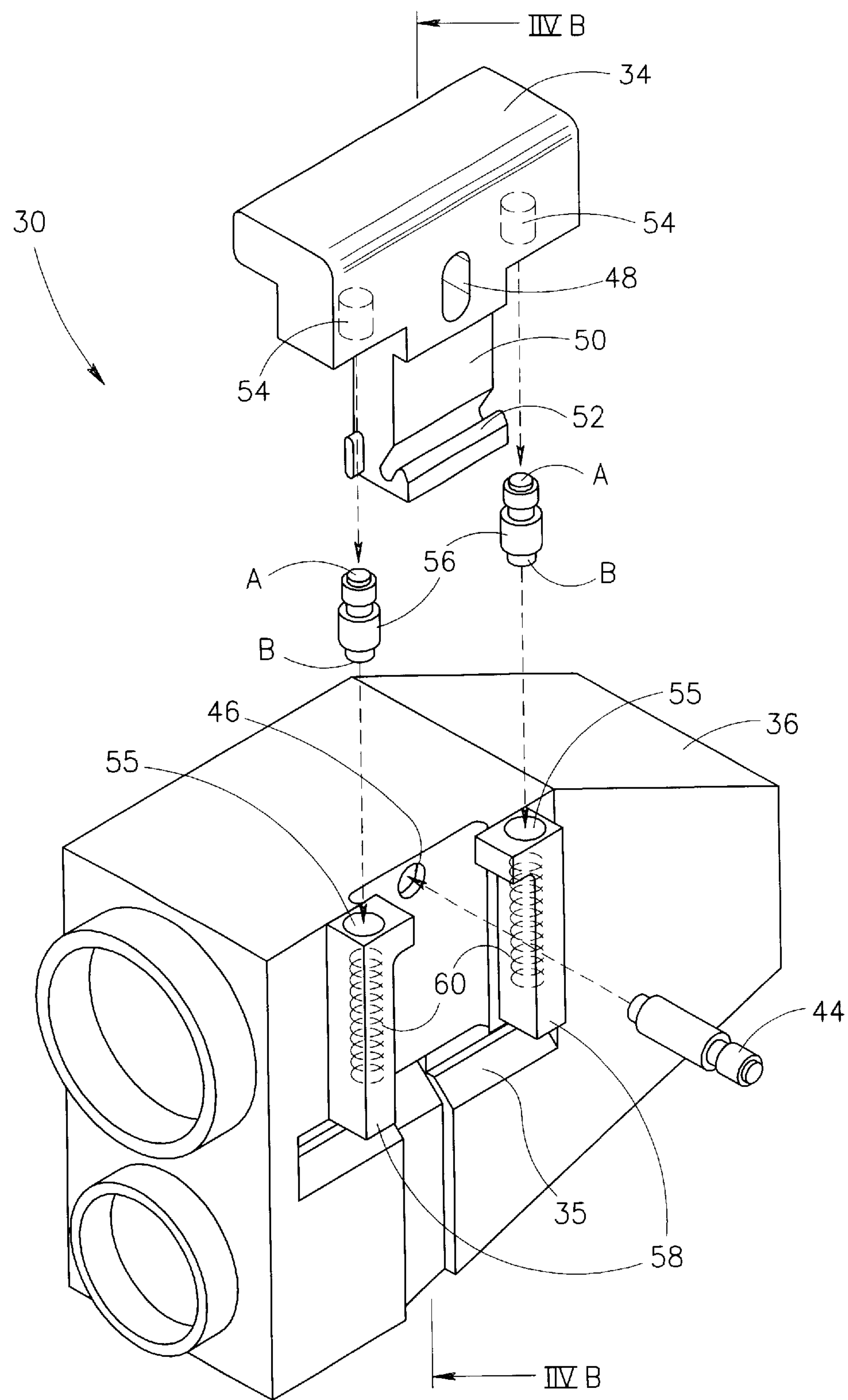
FIG. 7A is a detailed isometric illustration of an optical unit and a connector of FIG. 5, constructed and operative according to a preferred embodiment of the present invention.

Reference is now made to FIG. 7A, a detailed illustration of attachment 34 and optical unit 36. Additionally, reference is now made to FIG. 7B, which is a cross sectional view along line VIIB—VIIB of attachment 34 attached to optical unit 36.

Attachment 34 comprises a slot 48, a bar 50 and a hook 52. Hook 52 connects to mount 32 in a manner described hereinbelow.

Attachment 34 is securely held in place on optical unit 36, in a manner described hereinbelow, via a plurality of dowels 56 and rivet 44. Attachment 34 has a plurality of holes 54 which are intended for placement of a side A of dowels 56.

Optical unit 36 has one or more flanges 58, and an aligning hole 46. Springs 60 are placed within flanges 58. Additionally, flanges 58 have a plurality of holes 55 at one end, which receive a side B of dowels 56. In a preferred embodiment of the present invention, dowels 56 have conic surfaces which help to establish smooth engagement and accurate positioning.

Attachment 34 is attached to optical unit 36, as follows:

Sides A of dowels 56 are inserted into the associated holes 54 on attachment 34. Attachment 34 aligns above optical unit 36, with hook 52 facing away from optical unit 36 (FIG. 7A).

Attachment 34, and especially bar 50, slide into flanges 58; sides B of dowels 56 slide into associated holes 55. This affixes attachment 34 into position on the optical unit 36 (FIG. 7A). Springs 60, located within flanges 58, apply pressure onto dowels 56 (FIG. 7B)

Slot 48 aligns with aligning hole 46 and rivet 44 is inserted into hole 46, through slot 48. In a preferred embodiment, rivet 44 is generally the same size as aligning 46 and fits firmly in place (FIG 7B).

Figure 7B:
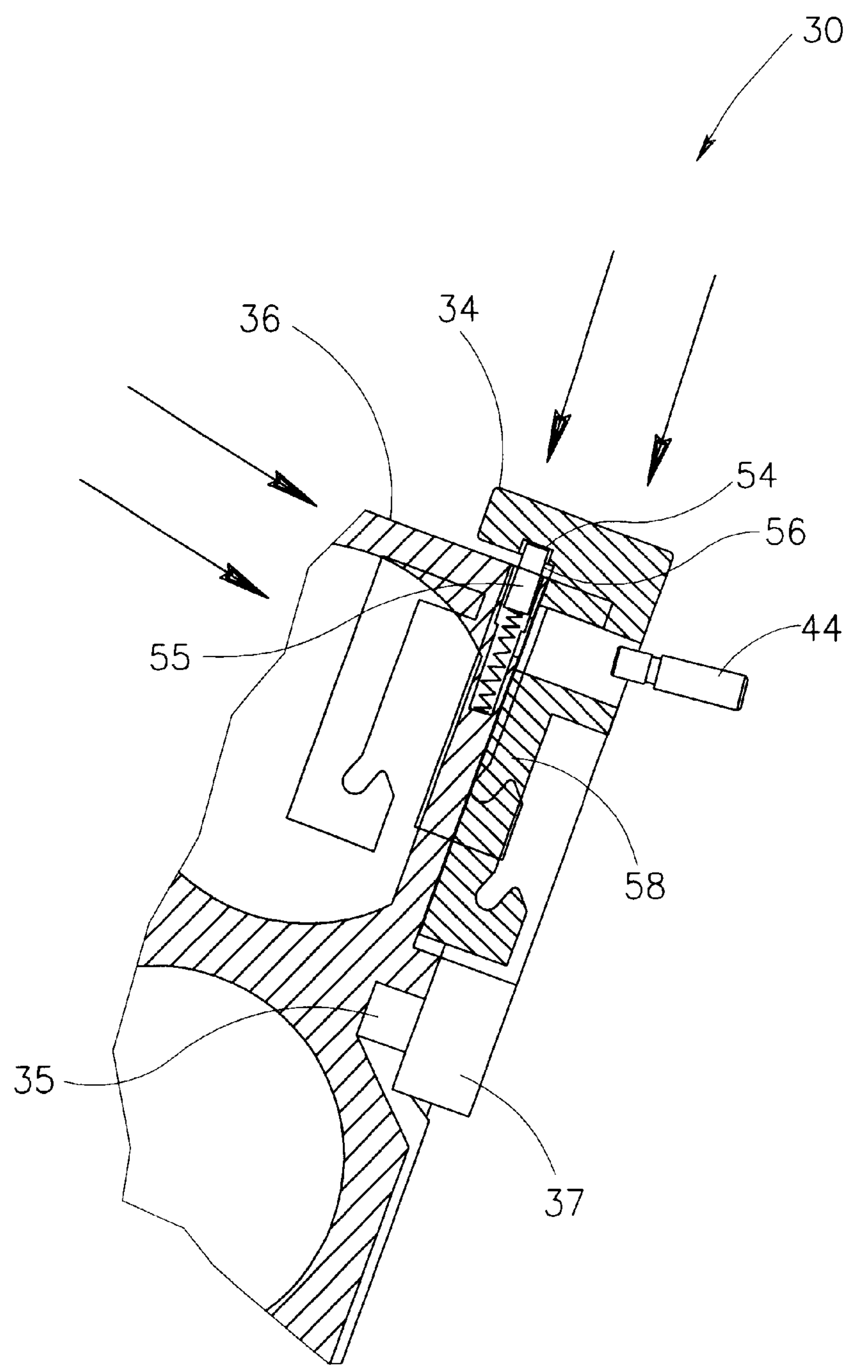
FIG. 7B is a cross sectional view along lines VIIB—VIIB of the elements illustrated in FIG. 7A.

Once rivet 44 is inserted into hole 48, through slot 48, rivet 44 holds mount 34 in place on optical unit 36, and prevents slippage between optical unit 36 and attachment 34 (FIG. 7B).

Figure 8A:
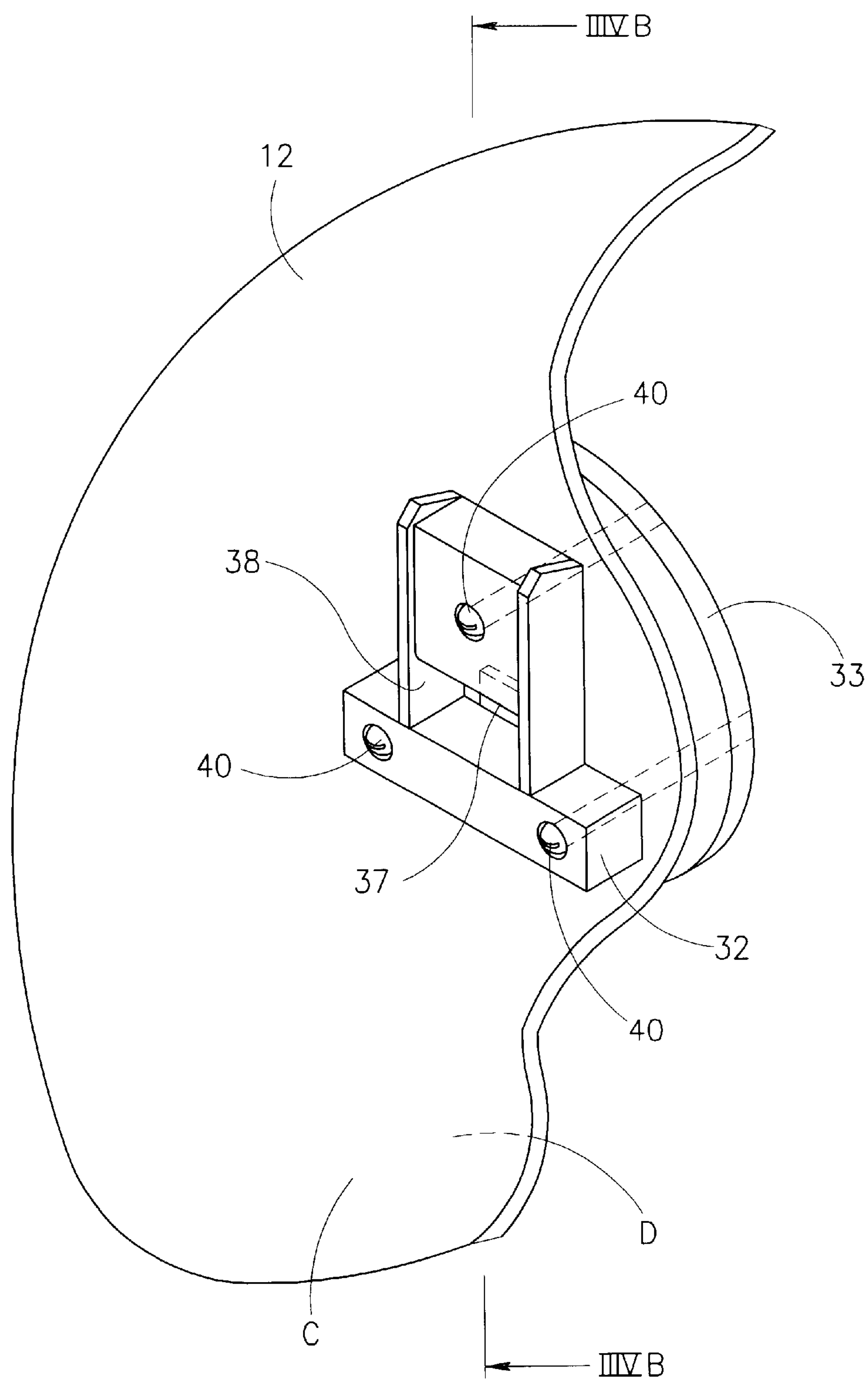
FIG. 8A is a detailed isometric illustration of a mount and a base of FIG. 5, constructed and operative according to a preferred embodiment of the present invention.
Figure 8B:
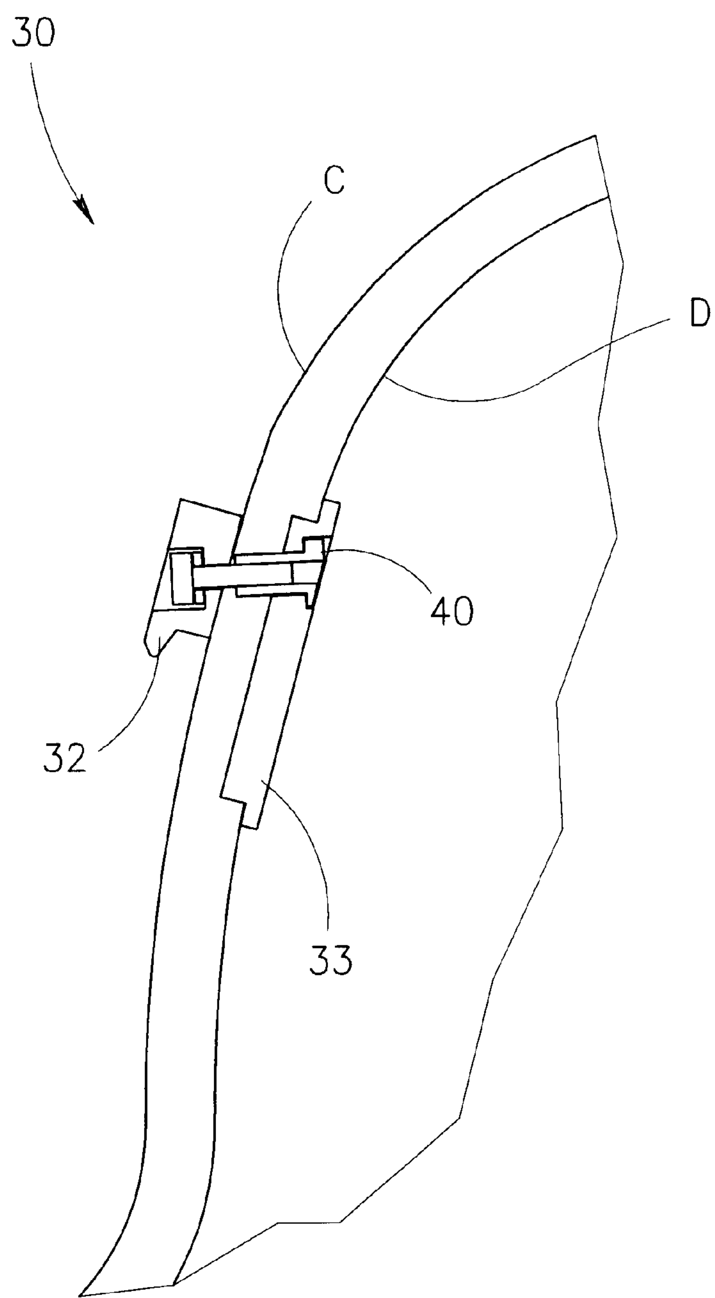
FIG. 8B is a cross sectional view along lines VIIB—VIIB of the elements illustrated in FIG. 8A.

Reference is now made to FIG. 8A, an isometric illustration of mount 32, base 33 and helmet 12. Reference is additionally made to FIG. 8B, a cross sectional view along line VIIIB—VIIIB of the elements illustrated in FIG. 8A.

Mount 32 is permanently mounted on the outside, referenced C, of helmet 12, directly opposite base 33. Base 33 is mounted on the inside, referenced D, of helmet 12. In a preferred embodiment, mount 32 and base 33 are affixed one to the other, through helmet 12, with a plurality of screws 40, as illustrated in FIG. 8B. In an alternative embodiment, mount 32 is permanently adhered to helmet 12 with a commercially available permanent adhesive, in which case, screws 40 and base 33 are optionally not used.

Alternatively, mount 32 comprises a meeting connector 37, which connects to electrical connector 35, illustrated in FIG. 6. Meeting connector 37 additionally connects to an electrical source, not shown in the Figures. Meeting connector 37, via the electrical source, supplies current to connector 35, which in turn supplies current to the electrical elements of system 30.

Mount 32 comprises a catch 38, which upon mounting of attachment 34 onto mount 32, functions as a receptacle for hook 52, illustrated in FIG. 7A. The no-adjustment mounting procedure is described hereinbelow.

Preferably, mount 32 is anchored onto helmet 12 during a one-time fitting session, and then becomes a fixed feature on helmet 12 requiring no additional positional adjustment. In a preferred application, mount 32 is anchored onto helmet 12 in the precise position determined by the method described hereinabove in reference to FIGS. 4A, 4B and 4C.

Figure 9A:
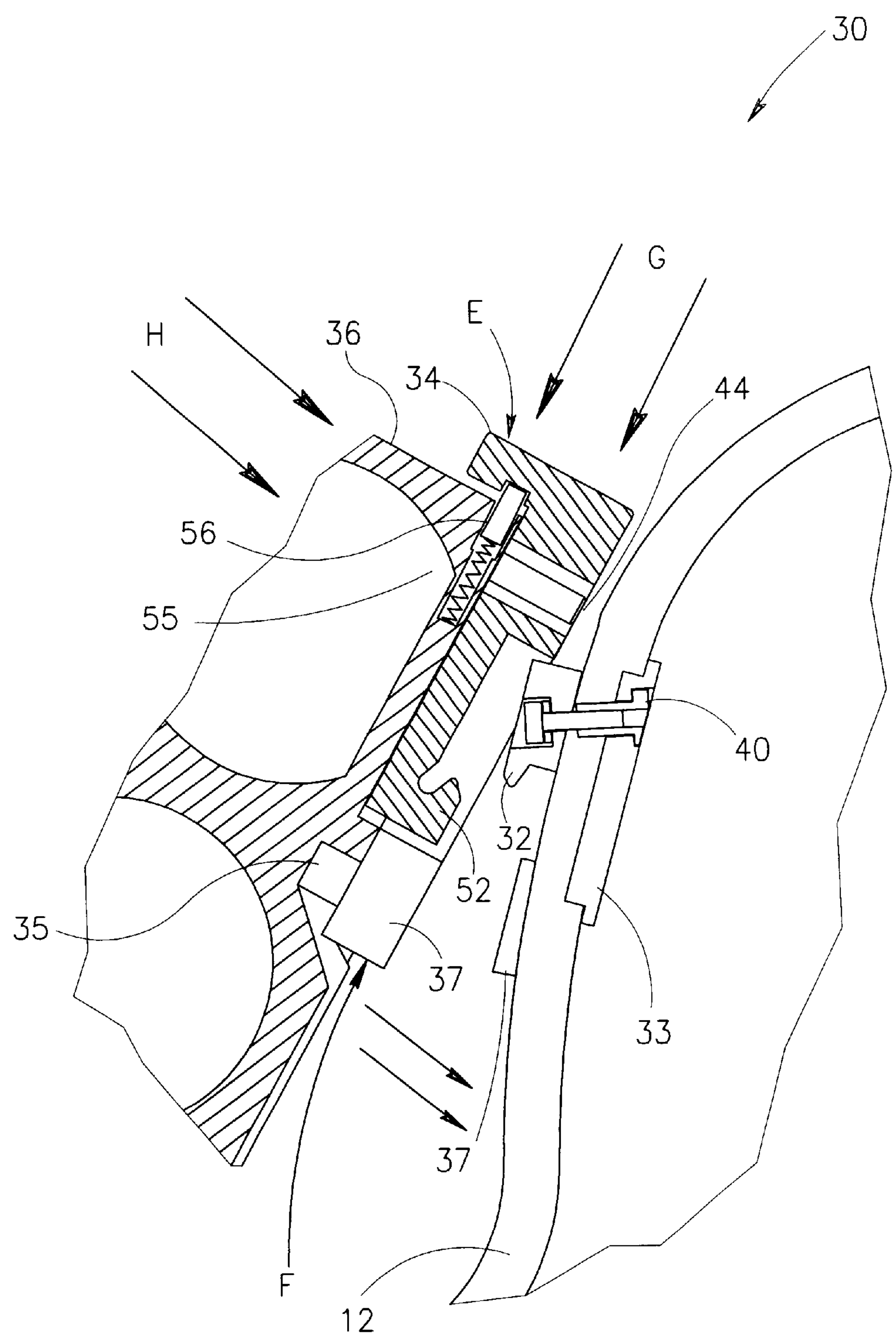
FIGS. 9A, 9B and 9C illustrate a no-adjustment mounting of the helmet mounted optical system of FIG. 6.
Figure 9B:
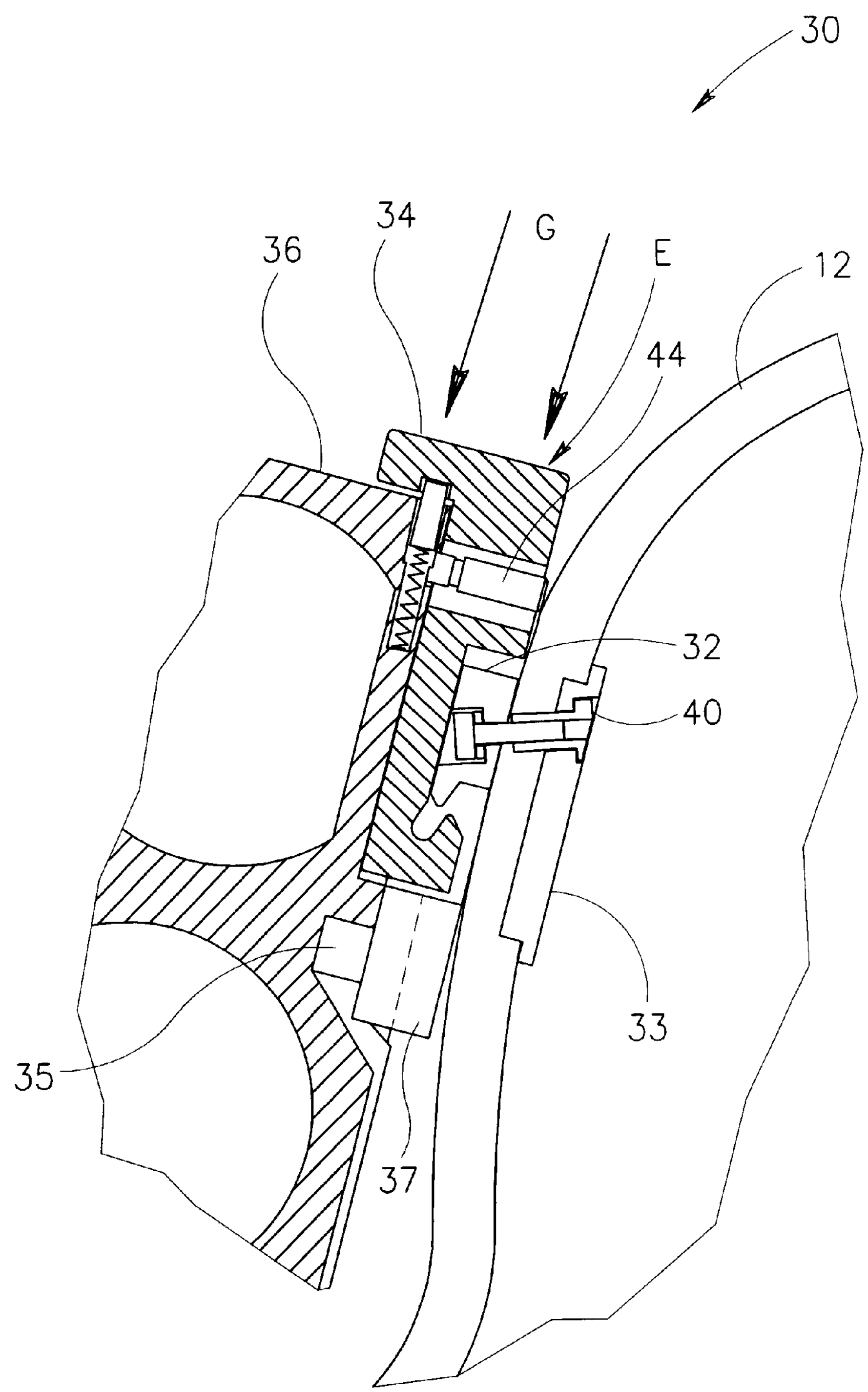
Figure 9C:
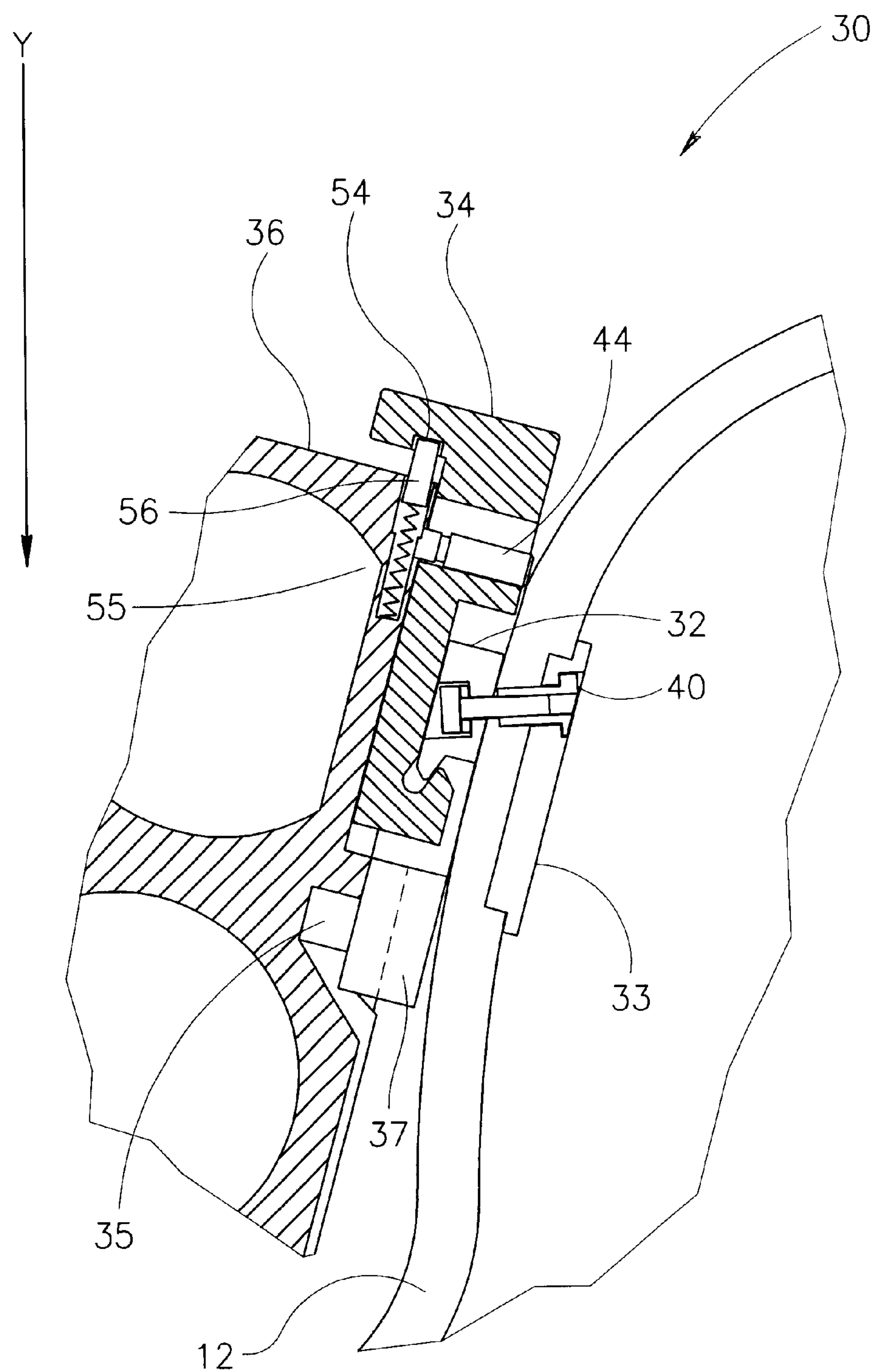

Reference is now made to FIGS. 9A, 9B and 9C which illustrate the no-adjustment mounting of optical unit 36 onto helmet 12, and specifically, the snap-and-fly attachment of attachment 34 onto mount 32.

Attachment 34 is firmly attached to optical unit 36 with rivet 44 in place, as described hereinabove. Mount 32 is attached to helmet 12 as described hereinabove. A pilot, not shown in FIGS. 9A, 9B or 9C, places helmet 12 on his head.

The pilot grasps the optical unit 36 in his hand, and positions it slightly above his head, at a location slightly above mount 32, as shown in FIG. 9A. Additionally as shown in FIG. 9A, the top portion of attachment 34, referenced E, is brought close to mount 32, leaving the bottom portion of attachment 34, referenced F, still at a distance from mount 32.

The pilot brings the top portion (referenced E) of attachment 34 in contact with mount 32. As shown in FIGS. 9A and 9B by arrows G and arrows H, the external pressure applied by the pilot pushes the optical unit 36 down and toward the helmet, causing springs 60 in optical unit 36 to compress, and providing enough slack to allow hook 52 to slip over mount 32.

Attachment 34 then snaps into place on mount 32. As shown in FIG. 9C, once attachment 34 is in place on mount 32, no external pressure is applied to optical unit 36. Springs 60 are thus free to apply pressure on attachment 34, holding attachment 34 in tension, and applying a force against gravity, represented by arrow Y. The counter-pressure of springs 60 hold hook 52 firmly against catch 38 and keeps attachment 34 in place on mount 32.

Thus, without any further positional adjustment, optical unit 36 is mounted onto helmet 12 in the exact location which positions optics 20, not shown in FIGS. 9A, 9B and 9C, exactly in front of the pilot's line of sight.

Figure 10:
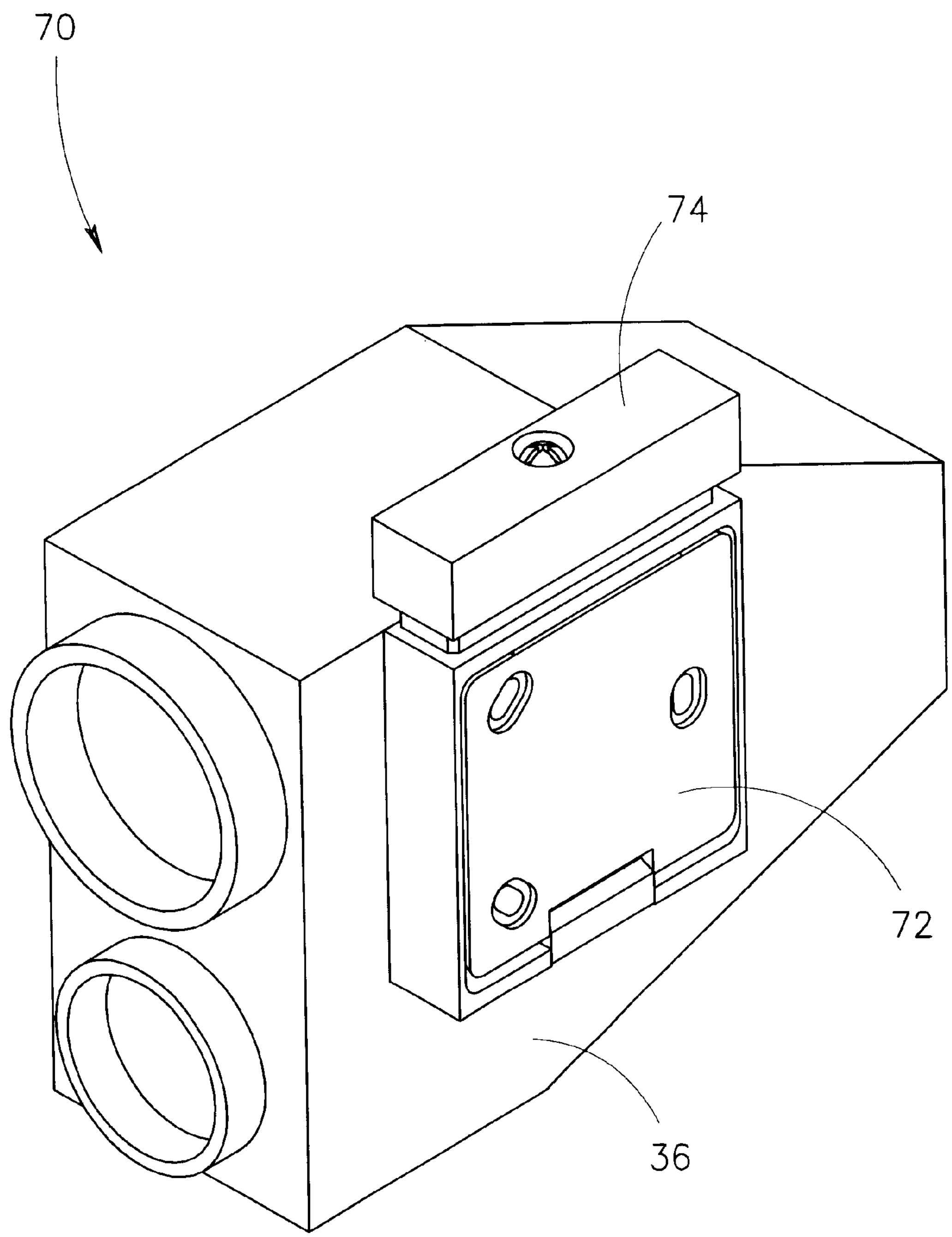
FIG. 10 is an isometric illustration of an alternative embodiment of a helmet mounted optical system, constructed and operative according to a further preferred embodiment of the present invention.

Reference is now made to FIG. 10, an alternative embodiment of a helmet mounted optical system 70, constructed and operative according to a preferred embodiment of the present invention. System 70 comprises optical unit 36, mount 72 and attachment 74. System 70 mounts onto helmet 12, and provides exact positioning of optical unit 36 after each re-mount.

Figure 11:
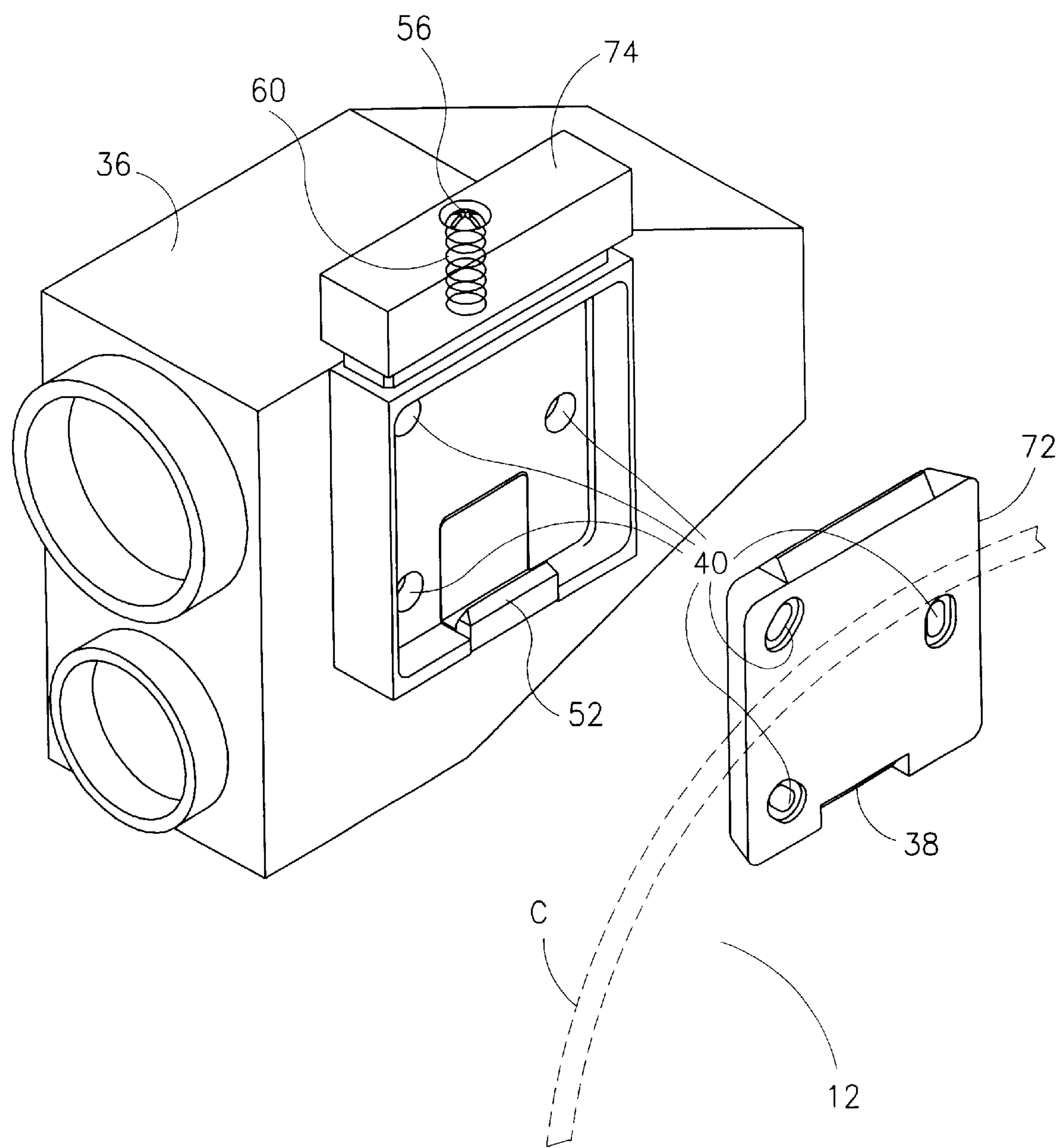
FIG. 11 is an exploded view of the helmet mounted optical system illustrated in FIG. 10.

Referring now to FIG. 11, which is an exploded view of system 70. Attachment 74 attaches to optical unit 36 with a plurality of screws 40. Attachment 74 comprises spring 60 and dowel 58. Spring 60 alternatively compresses during mounting of attachment 74 onto mount 72, and extends once attachment 74 is in place on mount 72. Attachment 74 comprises hook 52, which attaches to mount 72 in a manner to be described hereinbelow.

Mount 72 is permanently mounted on the outside, referenced C, of helmet 12, with a plurality of screws 40 or alternatively adhered with a commercially available permanent adhesive. Preferably, mount 72 is anchored onto helmet 12 during a one-time fitting session, and then becomes a fixed feature on helmet 12 requiring no additional positional adjustment. In a preferred application, mount 72 is anchored onto helmet 12 in the precise position determined by the method described hereinabove in reference to FIGS. 4A, 4B and 4C.

Mount 72 comprises a catch 38, which upon mounting of attachment 74 to mount 72, functions as a receptacle for hook 52.

Figure 12A:
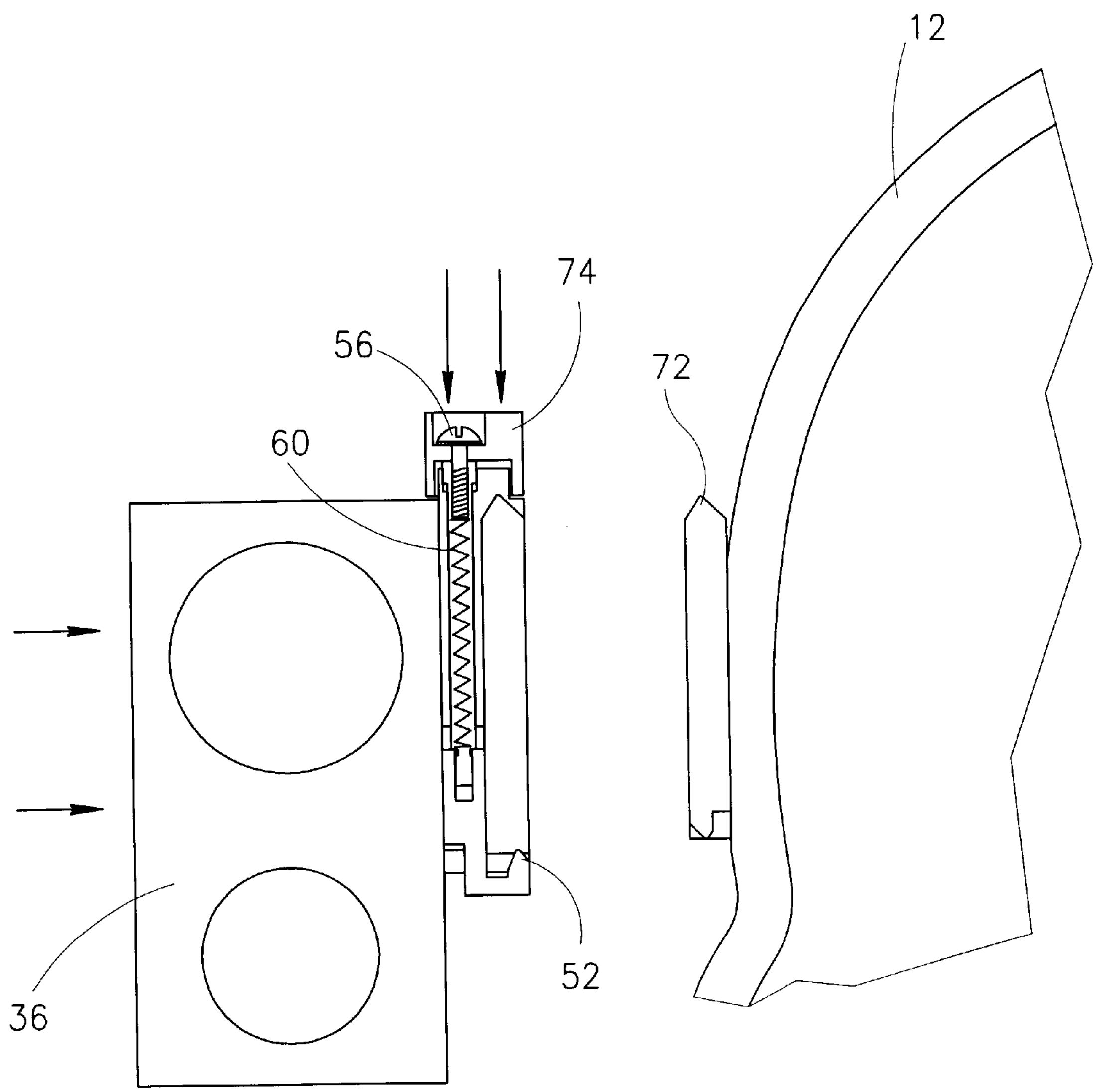
FIGS. 12A, 12B and 12C illustrate a no-adjustment mounting of the helmet mounted optical system illustrated in FIG. 5.
Figure 12B:
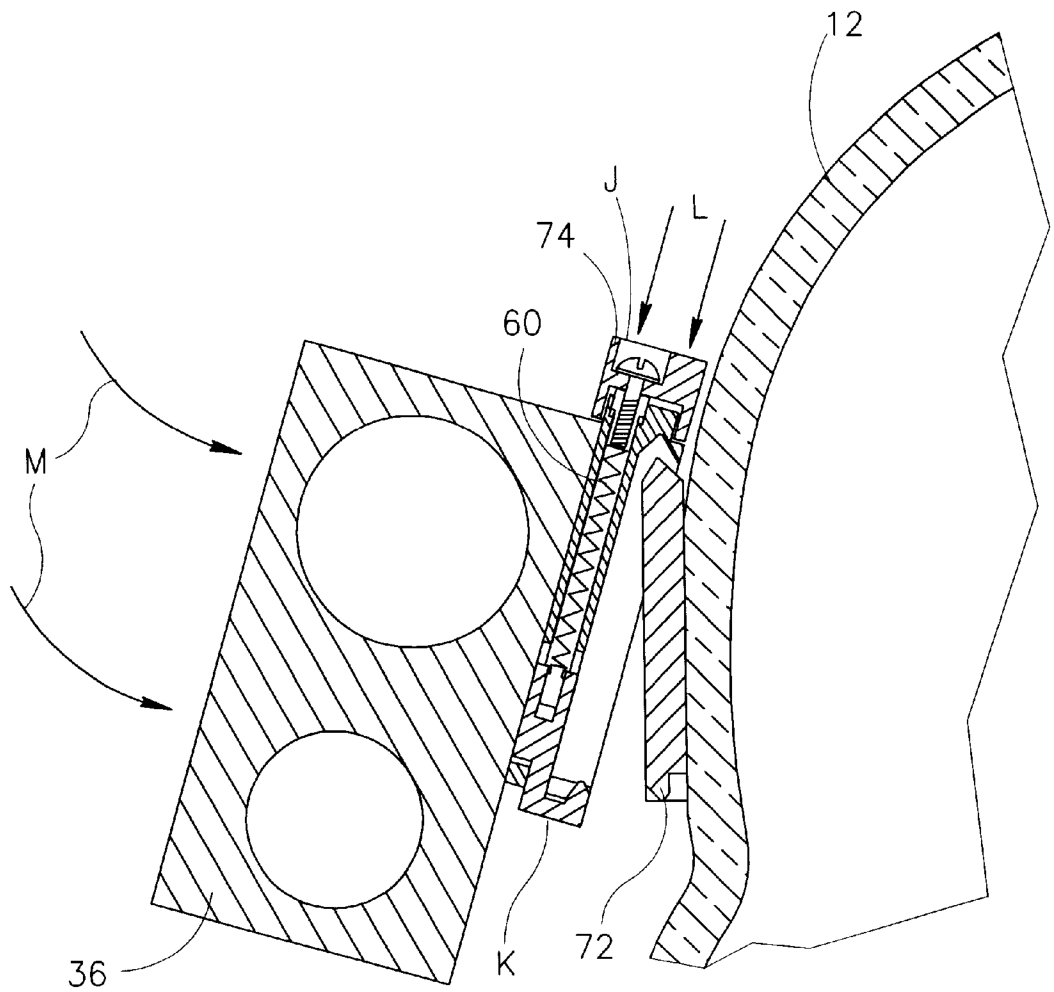
Figure 12C:
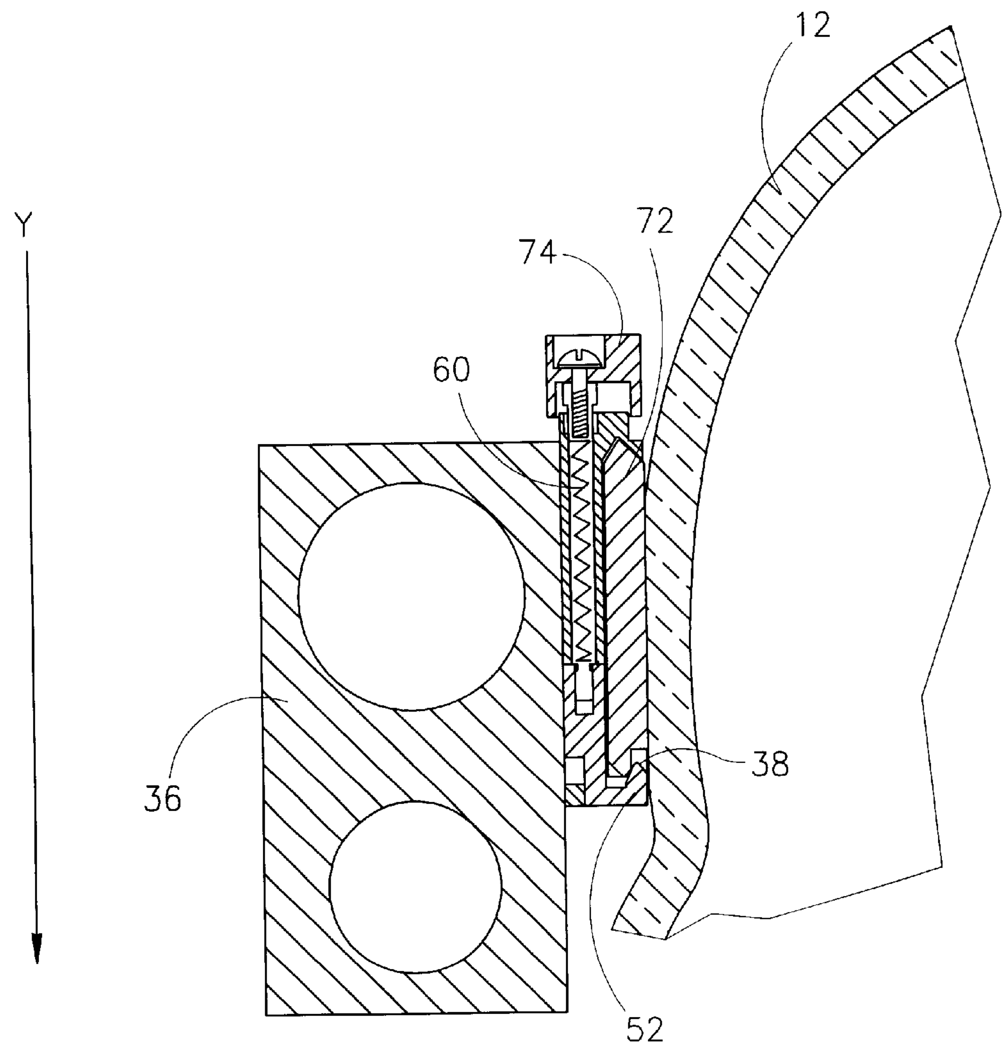

Reference is now made to FIGS. 12A, 12B and 12C, which illustrate the no-adjustment mounting of optical unit 36 onto helmet 12, and specifically, the "snap-and-go" attachment of attachment 74 onto mount 72.

Attachment 74 is attached to optical unit 36, as described hereinabove. Mount 72 is attached to helmet 12, as described hereinabove. A pilot, not shown in FIGS. 12A, 12B or 12C, places helmet 12 onto his head.

The pilot grasps the optical unit 36 in his hand, and positions it slightly above his head, at a location slightly above mount 72, as shown in FIG. 12A.

As shown in FIG. 12B, the top portion of attachment 74, labeled J, is brought close to mount 72, leaving the bottom portion of attachment 74, labeled K, still at a distance from mount 72. The top portion of attachment 74 (labeled J) is then brought into contact with mount 72.

As shown in FIG. 12B by arrows L and arrows M, external pressure applied by the pilot pushes the optical unit 36 down and toward the helmet, causing spring 60 in attachment 74 to compress, and provide enough slack to allow the connector to slip over mount 72.

Attachment 74 then snaps into place on mount 72. As shown in FIG. 12C, once attachment 74 is in place, no external pressure is applied to optical unit 36. Springs 60 are thus free to apply pressure to attachment 74, holding attachment 74 in tension, and applying a force against gravity, represented by arrow Y. The counter-pressure of springs 60 holds hook 52 firmly against catch 38 and keeps attachment 74 in place on mount 72.

Thus, without any further positional adjustment, optical unit 36 is mounted onto helmet 12 in the exact position which positions optics 20, not shown in FIGS. 12A, 12B and 12C, exactly in front of the pilots line of sight.

Figure 13:
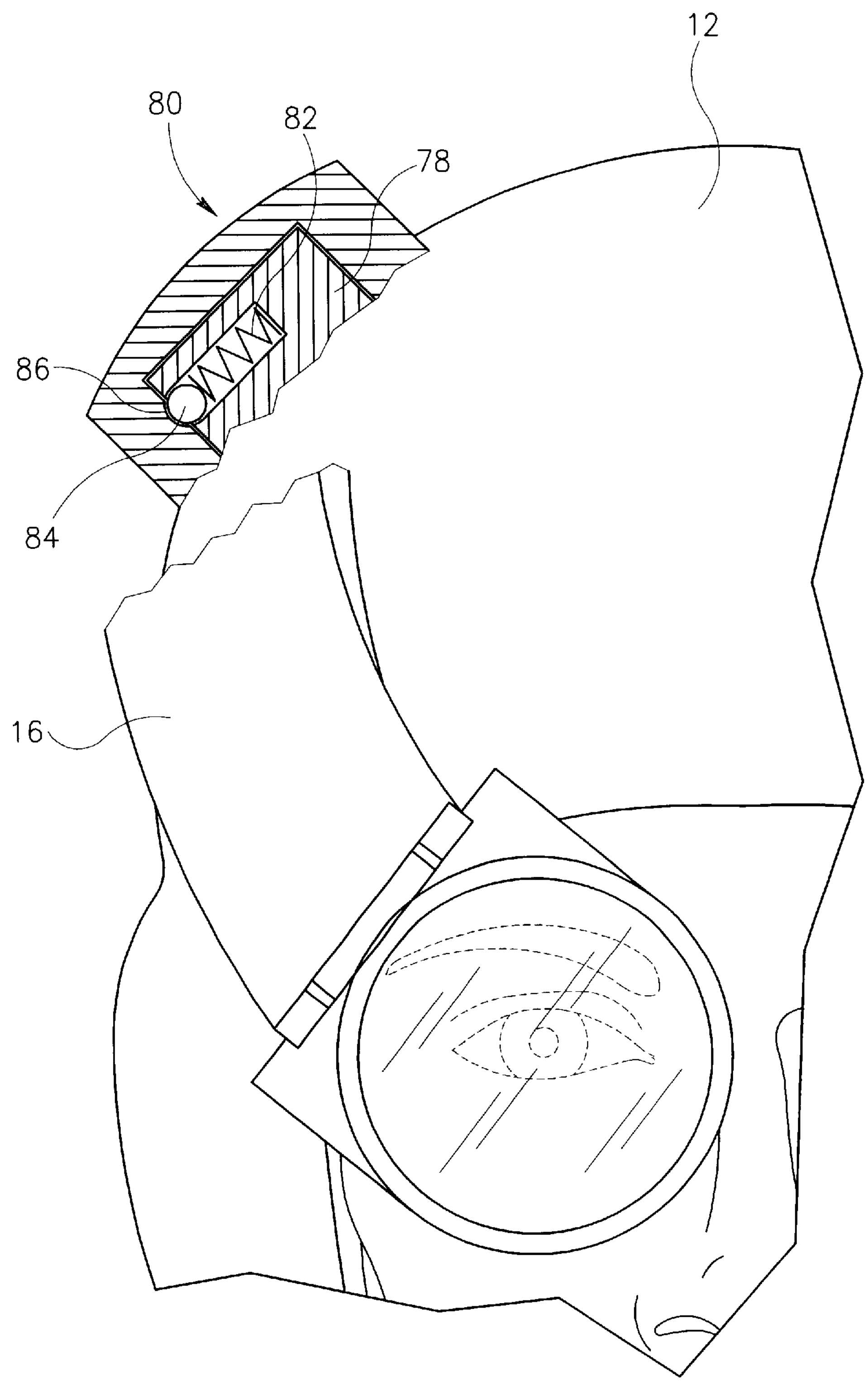
FIG. 13 is a schematic illustration of a molded mount and connector according to a preferred embodiment of the present invention.

Referring now to FIG. 13, which illustrates an embodiment of attachment 80 and mount 78. Attachment 80 mounts onto mount 78 and holds optical unit 16 in position and functions in a manner similar to that described in detail in the FIGS. 1, 2 and 3.

Mount 78 comprises a spring 82 and a ball 84, and is custom positioned onto helmet 12 using the method mentioned hereinabove. Attachment 80 has a notch 86 therein. When notch 86 lines up exactly with ball 84, spring 82 is released, pushing ball 84 into notch 86, and thus locking attachment 80, and, specifically optical unit 16, onto mount 78.

It will be appreciated by anyone skilled in the art that the hereinabove alternative embodiments are just a sampling of the possible embodiments of a non-adjustable helmet mounted optical system. Any mating of mount and connector that affords precise positioning and mechanical transferability is taught in the principles of the invention. Furthermore, any platform that employs helmet mounted systems is taught in the principles of the invention including but not limited to an electrical connector on the mount and its meeting connector on the optical unit.

Figure 14:
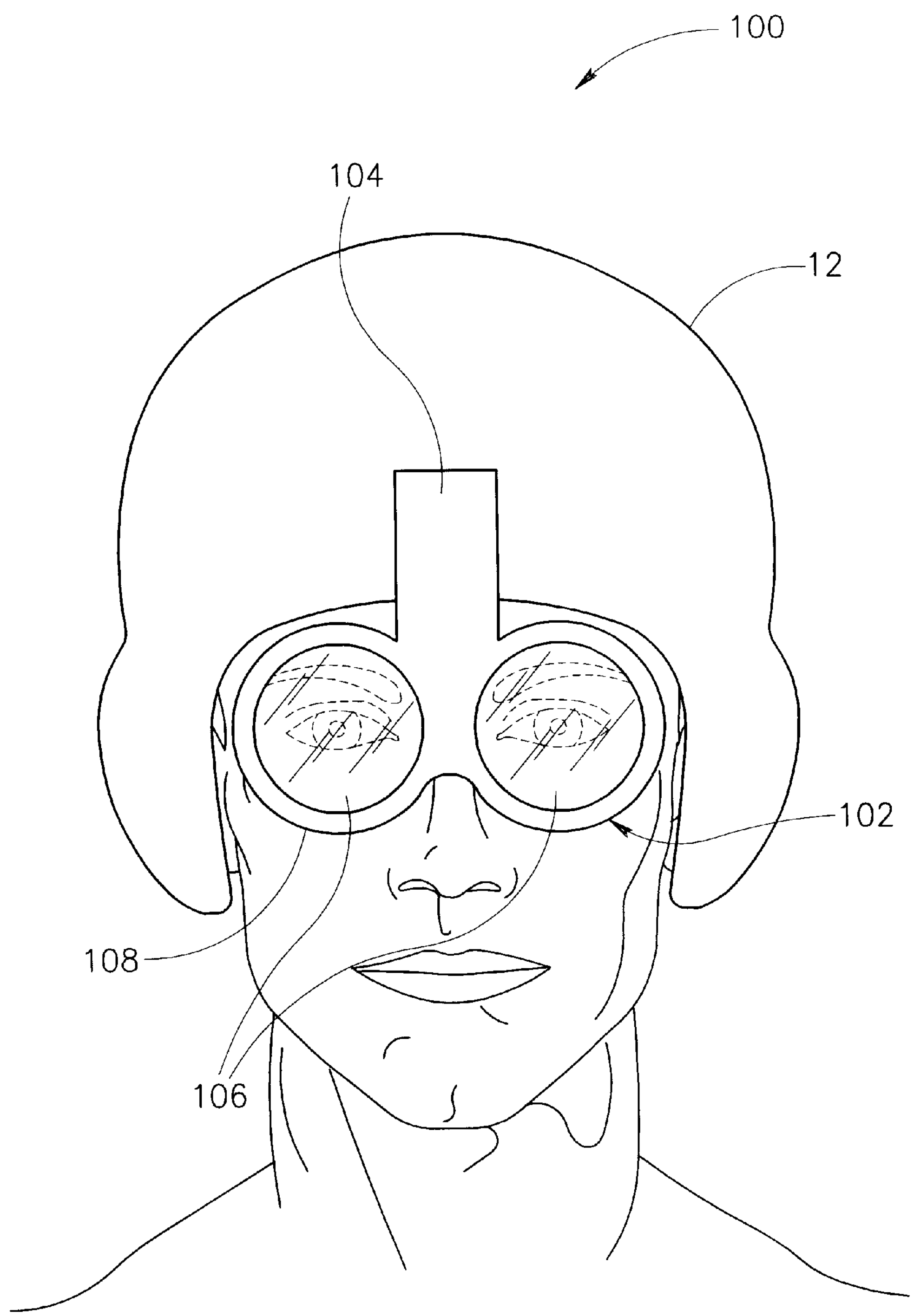
FIG. 14 is a schematic illustration of a helmet mounted night goggles unit according to an additional preferred embodiment of the present invention.

Reference is now made to FIG. 14 which illustrates a night vision helmet mounted system 100 comprising helmet 12 and night vision goggles 102. Night vision goggles 102 comprise a mounting fixture 104, a frame 108 and lenses 106.

Mounting fixture 104 is fixed onto helmet 12. Fixture 104 is either custom designed or pre-adjusted to match the dimensions of the user, in a manner similar to that of mount 14. Lenses 106 are inserted into a frame 108. Lenses 106 are any optical lens used for sight applications, such as standard issue night vision lenses, and are transferable from one user to another user, and from one helmet to another helmet.

In a preferred embodiment, lenses 106 are dedicated to a specific aircraft and remain with the associated aircraft between flights. Each pilot that uses the aircraft utilizes the lenses 106 associated with that aircraft.

It will be appreciated that the present invention is not limited by what has been described hereinabove, and that numerous modifications, all of which fall within the scope of the present invention, exist.

It will be appreciated by persons skilled in the art that the present invention is not limited by what has been particularly shown and described herein above any platform that employs helmet mounted systems is taught in the principles of the invention. Rather the scope of the invention is defined by the claims which follows:

What is claimed is:

1. A helmet mounted optical system comprising:

an optical system usable by more than one user;

a mount attachable to a helmet fitted to a specific user's head, said mount adapted to fixably receive said optical system in a position which provides viewing for said specific user.

2. A system according to claim 1, and comprising an electrical connection connected to said optical system.

3. A system according to claim 1, wherein said helmet is configured for use by any of the following group of users including a pilot, a motorcyclist, or a bicyclist.

4. A system according to claim 1, wherein said optical system comprises any of the following group including an image intensifier, a day/night optical system, a monocular, a binocular, a binocular, a camera, an ICCD, a display, and any optical relay system used for optical image eye transfer from direct or indirect optical source/electro-optic.

5. A mount custom fitted and fixedly attached to a helmet custom fitted for a user's head, said mount being arranged to snap fit to an optical system, and located on said helmet to ensure that said optical system is in place for use by said user.

6. A helmet custom fitted to a user's head and comprising a mount custom fitted and fixedly attached to said helmet.

7. A method for pre-adjusting a helmet mounted system for a user, and including the steps of:

having a helmet custom fitted to the user's head;

fixedly attaching a mount to said helmet;

custom fitting said mount to said user's head; and attaching an optical system to said mount, whereby when said optical system is placed onto said mount, said optical system is in place for use by said user.

* * * * *

UNITED STATES PATENT AND TRADEMARK OFFICE

CERTIFICATE OF CORRECTION

PATENT NO. : 6,249,386 B1
DATED : June 19, 2001
INVENTOR(S) : Yona, Zvi et al.

It is certified that error appears in the above-identified patent and that said Letters Patent is hereby corrected as shown below:

Column 8,
Line 42, please replace “binocular, a binocular” with -- biocular, a binocular --.

Signed and Sealed this

Twenty-fifth Day of March, 2003

JAMES E. ROGAN
*Director of the United States Patent and Trademark Office*